US008666441B2

(12) United States Patent
Chao et al.

(10) Patent No.: US 8,666,441 B2
(45) Date of Patent: Mar. 4, 2014

(54) SYSTEM AND METHOD FOR UPLINK POWER CONTROL IN A WIRELESS COMMUNICATIONS SYSTEM

(75) Inventors: Zhijun Chao, Plano, TX (US); Farid Khafizov, Plano, TX (US); Mazin Al-Shalash, Frisco, TX (US)

(73) Assignee: FutureWei Technologies, Inc., Plano, TX (US)

( * ) Notice: Subject to any disclaimer, the term of this patent is extended or adjusted under 35 U.S.C. 154(b) by 614 days.

(21) Appl. No.: 12/835,266

(22) Filed: Jul. 13, 2010

(65) Prior Publication Data

US 2011/0014875 A1  Jan. 20, 2011

Related U.S. Application Data

(60) Provisional application No. 61/225,482, filed on Jul. 14, 2009.

(51) Int. Cl.
*H04B 7/00* (2006.01)

(52) U.S. Cl.
USPC .......................... 455/522; 455/69; 455/63.1

(58) Field of Classification Search
USPC .............. 455/522, 69, 63.1, 67.11, 450, 517, 455/13.4, 436, 442; 370/343, 330–332, 370/347, 318
See application file for complete search history.

(56) References Cited

U.S. PATENT DOCUMENTS

| 7,406,128 | B2 * | 7/2008 | Sakamoto | 375/260 |
|---|---|---|---|---|
| 2004/0166884 | A1 * | 8/2004 | Oh et al. | 455/522 |
| 2006/0040698 | A1 * | 2/2006 | Shiu et al. | 455/522 |
| 2006/0252451 | A1 * | 11/2006 | Cho et al. | 455/522 |
| 2006/0262840 | A1 * | 11/2006 | Wang et al. | 375/221 |
| 2007/0191050 | A1 * | 8/2007 | Chang et al. | 455/522 |
| 2008/0045260 | A1 * | 2/2008 | Muharemovic et al. | 455/522 |
| 2008/0182542 | A1 * | 7/2008 | Choi et al. | 455/296 |
| 2008/0233995 | A1 * | 9/2008 | Shiu et al. | 455/522 |
| 2009/0213802 | A1 * | 8/2009 | Miki et al. | 370/329 |
| 2010/0238832 | A1 * | 9/2010 | Gunnarsson et al. | 370/252 |

OTHER PUBLICATIONS

"3rd Generation Partnership Project; Technical Specification Group Radio Access Network; Evolved Universal Terrestrial Radio Access (E-UTRA); Physical layer procedures (Release 8)," 3GPP TS 36.213, V8.7.0, 2009, 77 pages.
Alcatel-Lucent, "Fractional Power Control using Pilot Power Ratio Measurements for the E-UTRA Uplink," R1-071716, 3GPP TSG-RAN WG1 #48-bis, Mar. 26-30, 2007, 11 pages, St. Julians, Malta.
Ipwireless, "Uplink Power and IoT Control Method: Description and Simulation Results," Tdoc R1-070530, 3GPP TSG RAN WG1#47bis, Jan. 15-19, 2007, 7 pages, Sorrento, Italy.

* cited by examiner

*Primary Examiner* — Edward Urban
*Assistant Examiner* — Golam Sorowar
(74) *Attorney, Agent, or Firm* — Slater & Matsil, L.L.P.

(57) ABSTRACT

A system and method for uplink power control in a wireless communications system are provided. A method for power control of uplink transmissions by a communications device includes computing a power offset based on a signal target and a measured received signal power strength, generating a power control command from the power offset, and transmitting the power control command to the communications device. The signal target is based on control information provided by the communications device.

3 Claims, 8 Drawing Sheets

SYSTEM AND METHOD FOR UPLINK POWER CONTROL IN A WIRELESS COMMUNICATIONS SYSTEM

This application claims the benefit of U.S. Provisional Application No. 61/225,482, filed on Jul. 14, 2009, entitled "System and Method for Uplink Power Control in a Wireless Communications System," which application is hereby incorporated herein by reference.

TECHNICAL FIELD

The present invention relates generally to wireless communications, and more particularly to a system and method for uplink (UL) power control in a wireless communications system.

BACKGROUND

A cellular mobile communication system generally consists of a plurality of base stations (also commonly referred to as enhanced Node Bs (eNB), base terminal stations, communications controllers, and so forth) dispersed across a geographic service area to provide services to multiple users (also commonly referred to as user equipment UE), mobile stations, subscribers, and so on). To provide a high UL data rate, a power control technique may need to be used to control the UL interference level and as well as simultaneously maintain high UE specific SINR.

Traditional power control methods used in code division multiple access (CDMA)/wideband CDMA (WCDMA) communications systems, for example, is a form of fast power control designed to overcome fast-fading characteristics of a communications channel (or simply, channel). An important reason that the power control of CDMA was designed as a fast-power-control is that advanced techniques, such as adaptive modulation control and hybrid automatic repeat requested (HARQ), were not available at the time that CDMA communications systems were being developed.

In order to be effective, a power control technique has to maintain a robust UE specific channel in an interference environment generated by transmissions of UEs of neighboring eNBs as well as UEs of the same eNB. Techniques such as adaptive modulation control and HARQ are becoming a part of the newer wireless access technologies including WiMAX and the Third Generation Partnership Project (3GPP) Long Term Evolution (LTE), and are being used to maintain a reliable channel in conjunction with whatever power control techniques selected for use. However, power control is more than maintaining a reliable channel for individual UEs. Power control may be used to control interference level in the entire communications system and thus optimize the overall performance of the entire communications system.

SUMMARY OF THE INVENTION

These and other problems are generally solved or circumvented, and technical advantages are generally achieved, by embodiments of a system and method for uplink power control in a wireless communications system.

In accordance with a preferred embodiment of the present invention, a method for power control of uplink transmissions by a communications device is provided. The method includes computing a power offset based on a signal target and a measured received signal power strength, generating a power control command from the power offset, and transmitting the power control command to the communications device. The signal target is based on control information provided by the communications device.

In accordance with another preferred embodiment of the present invention, a method for receiving an uplink transmission at a communications controller is provided. The method includes computing a difference between a target and a received signal from a communications device served by the communications controller, generating a power control command based on the difference, transmitting the power control command to the communications device, and receiving the uplink transmission from the communications controller. The target is based on channel information provided by the communications device, and the uplink transmission is made at a transmit power level as specified by the power control command.

In accordance with another preferred embodiment of the present invention, a communications controller is provided. The communications controller includes an outer loop power control unit to be coupled to a signal input, and an inner loop power control unit coupled to the outer loop power control unit, to a receiver, and to a transmitter. The outer loop power control unit computes a signal target based on an interference margin, and the inner loop power control unit generates a power control command to set a transmit power level of transmissions from the communications device based on the signal target and a received signal from the communications device received by the receiver. The interference margin is based on channel information provided by a communications device served by the communications controller.

An advantage of an embodiment is that overall communications system performance is improved without significant message overhead. The embodiment is efficient in controlling communications system interference level while providing good performance at the same time.

Another advantage of an embodiment is that efficient control of communications system interference level along with good overall performance is possible. Furthermore, parameters may be used to control the interference level caused by a UE based on an UL load of the eNB. This helps to make load balancing tractable.

Yet another advantage of an embodiment is that the performance of eNB edge users and eNB central users may be balanced to help maintain a high level of performance in the communications system.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

Figure 1:
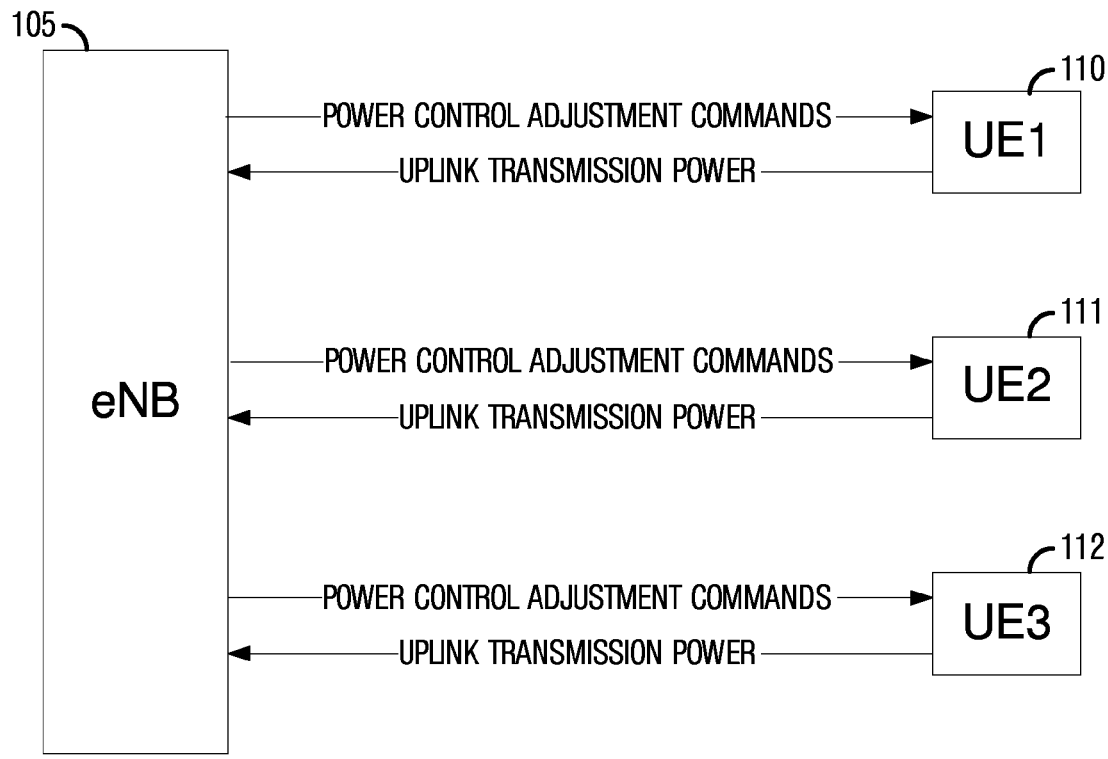
FIG. 1 is a diagram of a power control scenario in a LTE communications system.

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an orthogonal frequency division multiplexed (OFDM) communications system, such as a WiMAX or 3GPP LTE compliant communications system. The invention may also be applied, however, to other communications systems using other wireless access technologies, such as Universal Mobile Telecommunications System (UMTS), High-Speed Uplink Packet Access (HSUPA), 3GPP LTE-Advanced, and so forth.

There are several widely employed power control techniques. A traditional power control technique is to control the Signal to Interference and Noise Ratio (SINR) level of a UE around a given SINR target. A goal of controlling the SINR is to maintain robust UL channel. The technique is mainly adopted by CDMA for use when there is no other way to maintain a robust channel condition. A problem of using the SINR as a power control technique is that the power control behavior is more UE related and is not well suited for optimizing overall performance of the communications system. With a SINR based traditional power control technique, as the interference level at the eNB increases, the UEs' uplink transmission power will be increased in order to maintain a certain SINR level, which may lead to high interference in the communications system. In order to optimize the performance of the communications system, different "slow" power control strategies were developed.

A fractional power control (FPC) technique is based on a well-known slow power control technique. The FPC technique partially compensates the large scale fading in order to decrease the interference level of the communications system. The UL channel quality (e.g., SINR) degrades when the UE is moving away from the eNB, since its UL transmit power does not fully compensate for the pathloss. A benefit of FPC techniques is that the interference caused by the UEs that are far away from the eNBs also decreases, which improves the global performance.

There are basically two parameters in FPC through which the interference level is controlled and the performance balance between cell edge and cell center users is maintained. An advantage of FPC is that it is simple and no information is needed other than the pathloss. A disadvantage of the FPC is that it is not optimal, since it does not take into consideration the actual information of the interference caused by the UE to other eNBs.

In order to control the interference more effectively, a first method based on slow power control utilizes pathloss information from the serving eNB to the UE together with the strongest (or sum of all the) pathloss information from the neighbor eNB(s) to the same UE, with an intent to control the interference level caused by the UE to the neighbor eNBs surrounding the UE. The first method provides more precise (when compared to the FPC) interference control to neighbor eNBs.

Disadvantages of the first method include:

Unlike in a FPC method, there is no way to balance performance between eNB cell edge users and eNB cell center users; and The required pathloss information from the neighbor eNBs to the UE may not be easily obtained. Typically, this information is obtained from the reports sent by a UE to its serving eNB. However, due to the messaging overhead it may not be practical to expect every UE to send the required reports.

A second power control technique is a compromise between several different power control methods. A disadvantage of the second power control technique is that it also requires the pathloss information from the neighbor eNBs to the UE where the second power control technique is being applied.

The embodiments disclosed herein provide a technique for controlling UEs' UL transmission. The technique is not limited to 3GPP LTE communications systems only and may apply to other wireless access technologies as well. As described herein, the embodiments use downlink (DL) channel quality indicator (CQI) information to control the interference level of the communications system. Simulation results illustrate that the technique achieves good network performance and good balance in performance of the eNB edge users and the eNB center users.

FIG. 1 illustrates a power control scenario in a 3GPP LTE compliant communications system. UL data transmissions in a 3GPP LTE compliant communications system utilize a physical UL shared channel (PUSCH). An eNB 105 controls the UL transmission power of its UEs, such as UE 110, UE 111, and UE 112. The setting of the UE transmit power for the UL transmission is as defined by the 3GPP LTE technical standard, which basically uses the FPC strategy. However, the 3GPP LTE technical standard allows for the use different power control strategies via PUSCH power control adjustment commands. The PUSCH power control adjustment commands may be used to implement a close loop power control technique where the communications system performance is maintained within a reasonable range. As shown in the FIG. 1, eNB 105 sends a separate power control adjustment commands to the different UEs, and the UEs adjust their UL transmission power accordingly.

Figure 2:
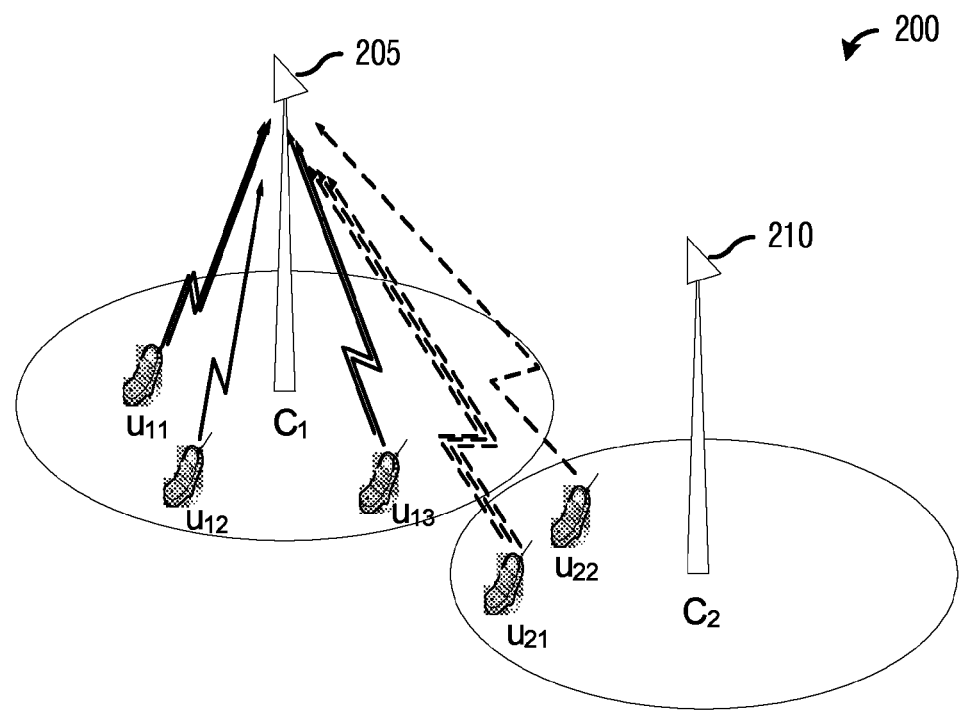
FIG. 2 is a diagram of a communications system.

The UL transmissions of UEs may cause interference with other eNBs. FIG. 2 illustrates a communications system 200. Communications system includes two eNBs, eNB 205 and eNB 210. UEs $u_{21}$ and $u_{22}$, which are served by eNB 210, cause interference to eNB 205 while UEs $u_{11}$, $u_{12}$ and $u_{13}$, which are served by eNB 205, are performing UL transmissions. A power control method is employed on both eNBs to improve the performance of the UL data transmission.

Figure 3:
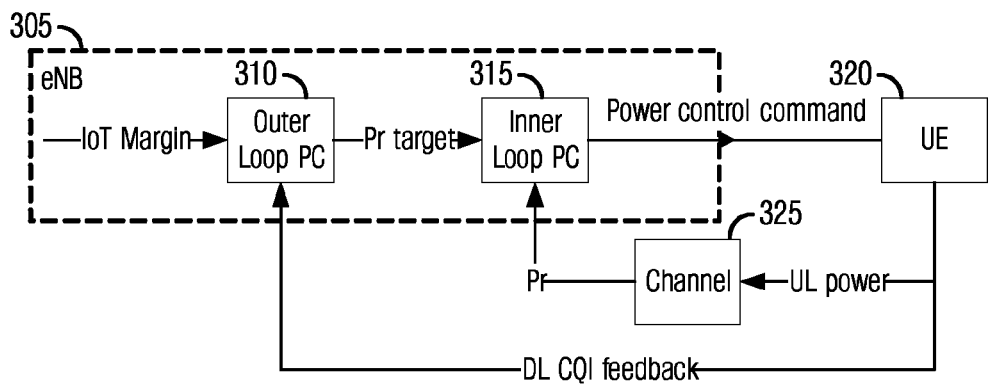
FIG. 3 is a diagram of UL power control modules in a communications system.

FIG. 3 illustrates UL power control modules in a communications system. As shown in FIG. 3, UL power control comprises two modules in an eNB 305: an outer loop power control module 310 and an inner loop power control module 315. Inner loop power control module 315 may provide power control commands to UEs, such as UE 320, according to a received signal power strength (Pr) from UE 320 and a target of the received power strength (Pr Target) provided by outer loop power control module 310.

When UE 320 receives a power control command (from eNB 305, for example), UE 320 may adjust the UL transmission power for its uplink data transmission based on the power control command. The UL data may be sent from UE 320 to eNB 305 through a wireless channel environment (shown as channel 325) at the UL transmission power level. On receiving the UL data, eNB 305 may measure the received power strength (Pr) of the UL data, and inner loop power control module 315 may make use of the received power strength measurement to control the UL transmit power of UE 320 (via power control commands).

At the same time, UE 320 periodically sends DL CQI feedback information to eNB 305, e.g., via a control channel. Outer loop power control module 310 may provide a target of the received power strength (Pr Target) to inner loop power control module 315 according to the DL CQI feedback information and a configuration of interference over thermal noise (IoT) margin(s) of UE 320.

Inner loop power control module 315 may be designed to control the UL power of UE 320. eNB 305 may send to UE 320 power control commands, which may include a power adjustment offset. The power adjustment offset may be based on the received signal power strength (Pr) from UE 320 and the target of the received power strength (Pr Target) provided by outer loop power control module 310.

Boundary conditions may be considered when a UE reaches its maximum transmit power level and two options may be implemented:

1) Inner loop power control module 315 may consider the boundary conditions and prevent the UE from increasing its transmit power level, i.e., no positive power offset adjustment will be sent to the UE when the UE reaches its maximum transmit power level limit; or 2) Inner loop power control module 315 does not consider the boundary condition at all. It controls the UE's UL power only according to the received signal power strength.

Figure 4:
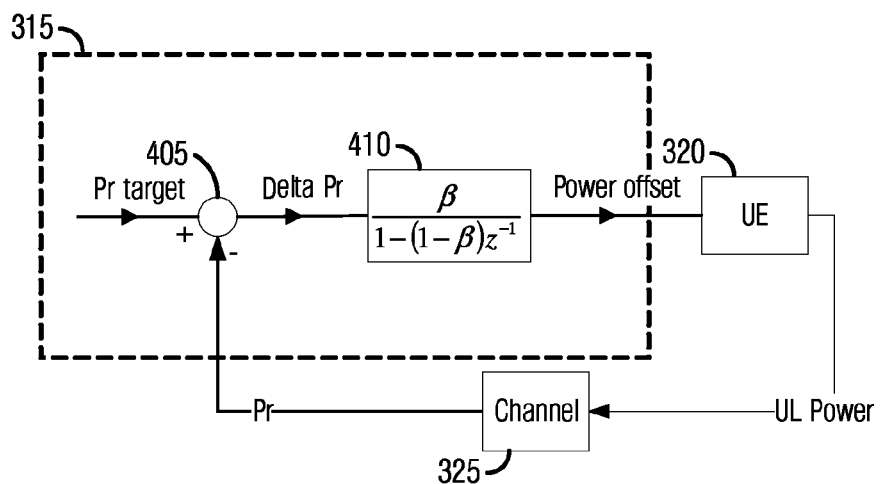
FIG. 4 is a diagram of a view of a communications system with emphasis on inner loop power control module.

FIG. 4 illustrates a view of a communications system with emphasis on inner loop power control module 315. When UE 320 transmits UL data to eNB 205 over channel 325 at a transmit power level that is controlled by power control modules of eNB 205, eNB 205 may measure the UL transmission to determine the received signal power strength (Pr). Then, in inner loop power control module 315, a difference (Delta Pr) between Pr and the target of the received signal power strength (Pr Target) may be obtained, for example, by summing point 405. Delta Pr may be expressed as:

$$\text{Delta } Pr = Pr \text{ Target} - Pr.$$

Filter 410 may be used to filter an output of summing point 405 (Delta Pr), with an output of filter 410 (Power Offset) being transmitted to UE 320. According to an embodiment, filter 410 may be implemented as a simple alpha filter (as shown in FIG. 4). In an alternative embodiment, filter 410 may be set to perform no filtering at all (when β is set to one (1), for example). In yet another alternative embodiment, any other form of filter, such as infinite impulse response (IIR) or finite impulse response (FIR) filters, may be used to implement filter 410.

According to some technical standards, such as 3GPP LTE, for example, the power offset may only have certain discrete values as specified in the technical standard. In this case, the power offset may be selected as follows:

1) Set the power offset to a specified discrete value that is closest to the Power Offset, 2) Set the power offset to a specified value that is the largest specified value smaller than the Power Offset, or 3) Set the power offset to a specified value that is the smallest specified value larger than the Power Offset.

Power Offset may be transmitted to UE 320 in a power control command and may be used to set the UL transmit power level of UE 320 for a subsequent UL transmission.

Figure 5:
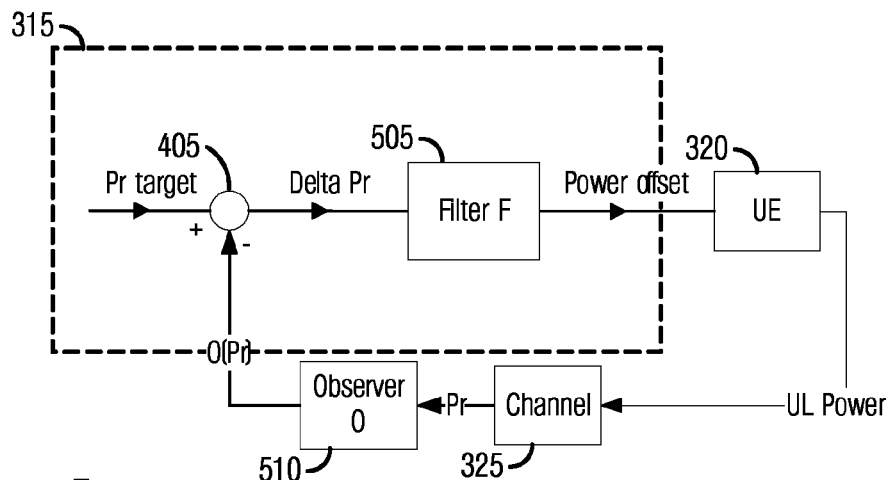
FIG. 5 is a diagram of a view of a communications system with emphasis on inner loop power control module.

FIG. 5 illustrates a view of a communications system with emphasis on inner loop power control module 315. As shown in FIG. 5, inner loop power control module 315 is a generalized form of inner loop power control module 315 shown in FIG. 4, with a generic filter 505 shown in place of filter 410. Communications system also includes an observer "O" 510 that may be added to obtain an estimation of Pr when there is a lot of noise in channel 325, which may prevent eNB 305 from obtaining a precise measurement of Pr by itself.

According to an embodiment, observer 510 may be implemented as a filter, such as a Kalman filter with its filter parameters being carefully designed according to the dynamic properties of the communications system. Although the discussion presents the use of a Kalman filter, observer 510 may be implemented using a variety of other functions, such as other filters. Therefore, the discussion of a Kalman filter should not be construed as being limiting to either the scope or spirit of the embodiments.

Figure 6:
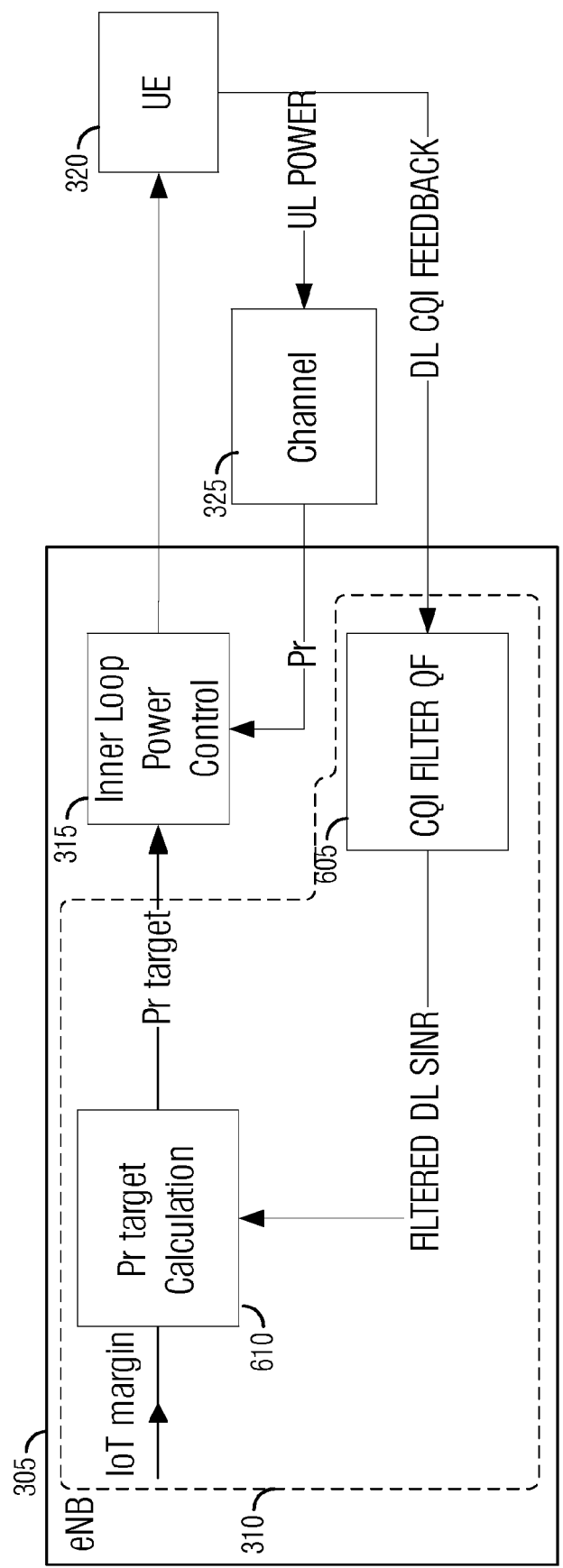
FIG. 6 is a diagram of a view of a communications system with emphasis on outer loop power control module.

FIG. 6 illustrates a view of a communications system with emphasis on outer loop power control module 310. Outer loop power control module 310 may be used to compute the Target of the received signal power strength (Pr Target) for inner loop power control module 315. Pr Target may be set according to the CQI feedback information received from UE 320 and a parameter IoT margin, which may be used to control the interference level of the communications system. Typically, the CQI feedback information from UE 320 may be an index or some other indicator representing DL channel quality. According to an embodiment, the CQI feedback from UE 320 may also be used to control the UL transmission power of UE 320.

Outer loop power control module 320 includes a CQI filter "QF" 605 and a Pr Target calculation module 610. CQI filter 605 may be used to map the CQI feedback from UE 320 to a SINR value (either in dB or linear domain, with dB values being preferred). The mapping of the CQI feedback to a SINR value (referred to as DL SINR value) may be performed through the use of a table, such as a look-up table, a memory, a function, or so forth. CQI filter 605 may also be used to filter the DL SINR value to obtain a long term DL SINR value. The filtering performed in CQI filter 605 may be similar to the filtering performed in filter 410 or filter 505 in inner loop power control module 315 shown in FIGS. 4 and 5. The filtering performed by CQI filter 605 may include no filtering, alpha filter, or any other type of filter.

Pr Target calculation module 610 may be used to calculate the Pr Target according to an output of CQI filter 605, such as the DL SINR value, the long term DL SINR value (i.e., the filtered downlink SINR (preferably in the dB domain)), and IoT Margin. According to a preferred embodiment, Pr Target calculation module 610 may calculate Pr Target as follows:

$$Pr\ \text{target} = IoT\ \text{Margin} + \alpha \times \text{Filtered DL SINR} + \beta \times \text{PATHLOSS}_{DL}(\text{UE}),\ \text{or} \quad (1)$$

$$Pr\ \text{target} = IoT\ \text{Margin} + \alpha \times \text{Filtered DL SINR} + \beta \times \text{PATHLOSS}_{UL}(\text{UE}), \quad (2)$$

where $\text{PATHLOSS}_{DL}(\text{UE})$ and $\text{PATHLOSS}_{UL}(\text{UE})$ are the DL and UL channel gain in the dB domain, respectively, $\alpha$ is a tuning coefficient, and $\beta$ is a constant coefficient. The pathloss information may be reported by UE throughput messages exchanged between UE 320 and eNB 305. The throughput messages may be exchanged periodically or upon the occurrence of an event.

Although the above discussion focuses on controlling the received power strength (Pr) by setting the Target received power strength (Pr target), it may also be possible to control the UE's transmit power level by controlling the SINR and/or a transmit power level. For example, inner loop power control module 315 of eNB 305 may be used to control the SINR or the transmit power level according to a SINR target (SINR target) or a target transmit power level (P1 target) set by outer loop power control module 320.

According to an embodiment, outer loop power control module 320 may be calculated as follows:

Controlling the received power strength by setting a SINR target, $$\text{SINR target} = Pr\ \text{target} - \text{Averaged\_Interference};$$

Controlling the received power strength by setting a Target transmit power level, $$Pt\ \text{target} = Pr\ \text{target} + \text{PATHLOSS}_{DL}(\text{UE}),\ \text{or}$$

$$Pt\ \text{target} = Pr\ \text{target} + \text{PATHLOSS}_{UL}(\text{UE}).$$

The controlling of the received power strength by setting the Target received power strength (Pr target), the SINR target (SINR target), or the Target transmit power level (P1 target) may be substantially similar.

Power control may be parameterized as follows:

1. IoT Margin—a parameter to control communications system interference level. It may also be used to balance the load between the eNBs.
2. $\alpha$—a parameter to tune a balance between the performance of eNB cell edge users and eNB cell center users.
3. Filter parameters in inner loop power control module (filter 505 in FIG. 5, for example)—parameters to prevent UL transmission power of a UE from changing too rapidly.
4. Filter parameters in inner loop power control module (observer 510 in FIG. 5, for example)—parameters to eliminate noise present in channel from the received signal power strength measurement.
5. Filter parameters in outer loop power control module (CQI filter 605 in FIG. 6, for example)—parameters to help obtain the long term DL SINR value for a UE. Parameters 3-5 may be related to the dynamic properties of the communications system, while parameters 1-2 may be related to the long term performance of power control.

Figure 7:
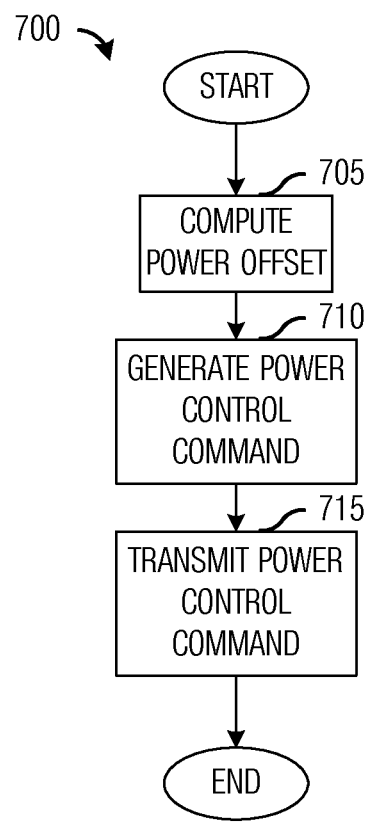
FIG. 7 is a flow diagram of operations in UL transmit power control.

FIG. 7 illustrates a flow diagram of operations 700 in UL transmit power control. Operations 700 may be indicative of operations occurring in an eNB as the eNB controls the UL transmit power of a UE being served by the eNB. The eNB controls the UL transmit power of the UE by determining information related to the UL transmissions of the UE and in conjunction with information related to a DL channel between the eNB and the UE, compute power control commands that may be transmitted to the UE to cause the UE to change its transmit power levels. Operations 700 may occur while the eNB is in a normal operating mode and is serving UEs.

Operations 700 may begin with the eNB computing a power offset (block 705). According to an embodiment, the eNB may compute the power offset based on a signal target, such as a target received power strength (Pr target), a target transmit power strength (Pt target), or a SINR target (SINR target), as well as a received signal power measurement. The target received power strength may be a desired power level of transmissions from the UE as received at the eNB, the target transmit power strength may be a desired power level of transmissions from the UE as made by the UE, and the SINR target may be a desired SINR for a channel between the UE and the eNB. The received signal power measurement may be a measurement of a received power of a transmission made by the UE and received by the eNB.

The signal targets may be determined by the eNB for the UE based on information provided by the UE. According to an embodiment, the information provided by the UE is channel information for a DL channel between the eNB and the UE. Preferably, the channel information comprises channel quality indicators (CQI). In order to reduce feedback overhead, the channel quality information may be quantized (or otherwise compressed) to reduce the amount of feedback information transmitted to the eNB. Furthermore, the signal targets may be based on an interference margin.

According to an embodiment, the power offset may be computed as a difference between the signal target (Pr target, Pt target, or SINR target) and the received signal power measurement. Preferably, the signal target may be subtracted from the received signal power measurement.

The eNB may compute a power control command to transmit to the UE (block 710). The power control command may be generated from the power offset. According to an embodiment, the power control command comprises a power adjustment offset that may be used by the UE to adjust its transmit power level. As an example, the power control command may be one value out of several discrete values that represents the power adjustment offset. Depending on the value of the power adjustment offset, the power control command may be a discrete value that is closest to the power offset. Alternatively, the power control command may be a discrete value that is a largest discrete value that is smaller than the power offset or a discrete value that is a smallest discrete value that is larger than the power offset.

The eNB may then transmit the power control command to the UE (block 715) and operations 700 may then terminate. According to an embodiment, if the eNB determines that the UE is already transmitting at its highest transmit power level, the eNB may elect to not transmit the power control command.

According to an embodiment, the eNB may filter the power offset prior to generating the power control command. The eNB may make use a variety of filters, such as an alpha filter, an IIR filter, a FIR filter, or so forth to filter the power offset.

According to another embodiment, the eNB may make use of an observation unit to help assist the eNB obtain an estimate of the transmit power level in situations such as when there is a significant amount of noise in the UL channel between the UE and the eNB. The observation unit may be implemented using a filter, such as a Kalman filter.

Simulation studies of the impact of parameters 1 and 2 are presented below. A simulation scenario is as follows: a communications system of 19 eNB sites with three sectors in each site, an inter-site distance of 500 meters, a penetrate loss of 20 dB, and a shadow fading with +/−8 dB variation. Interference is calculated in a wrap around manner and 570 UEs are present in the communications system, with full buffer UL services.

Figure 8A:
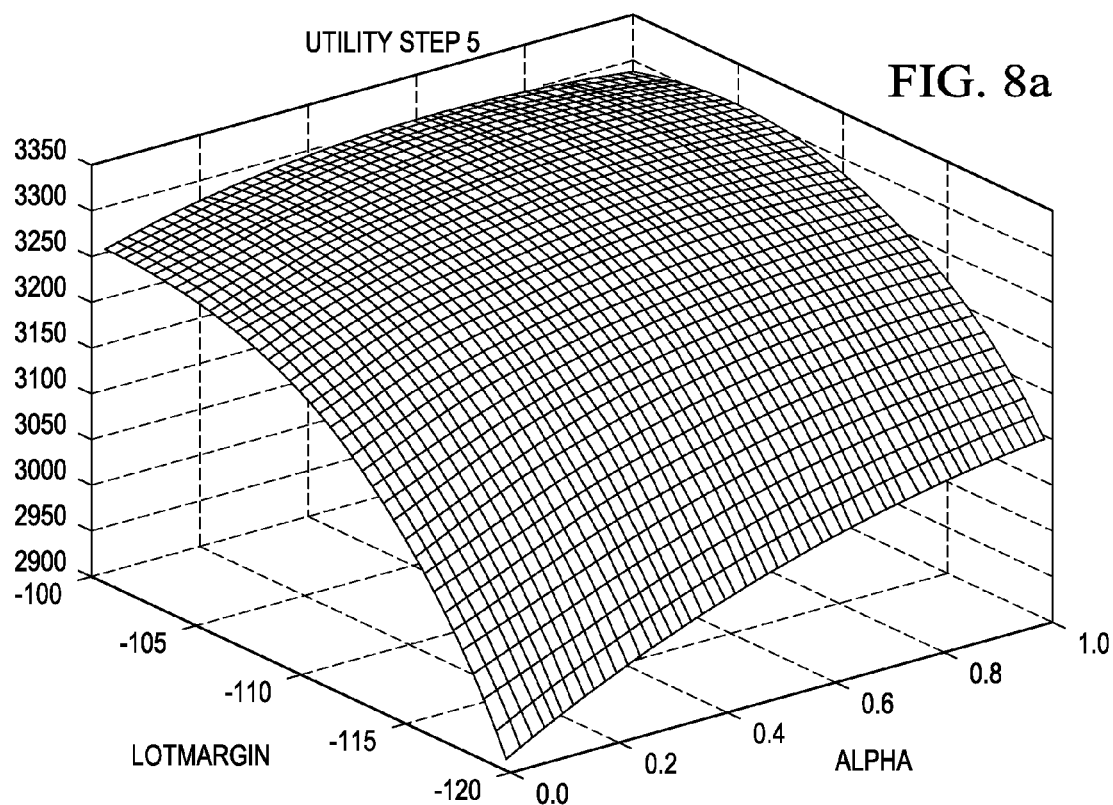
FIGS. 8a and 8b are data plots of the utility of proportional fairness with respect to the parameters α and IoT Margin.
Figure 8B:
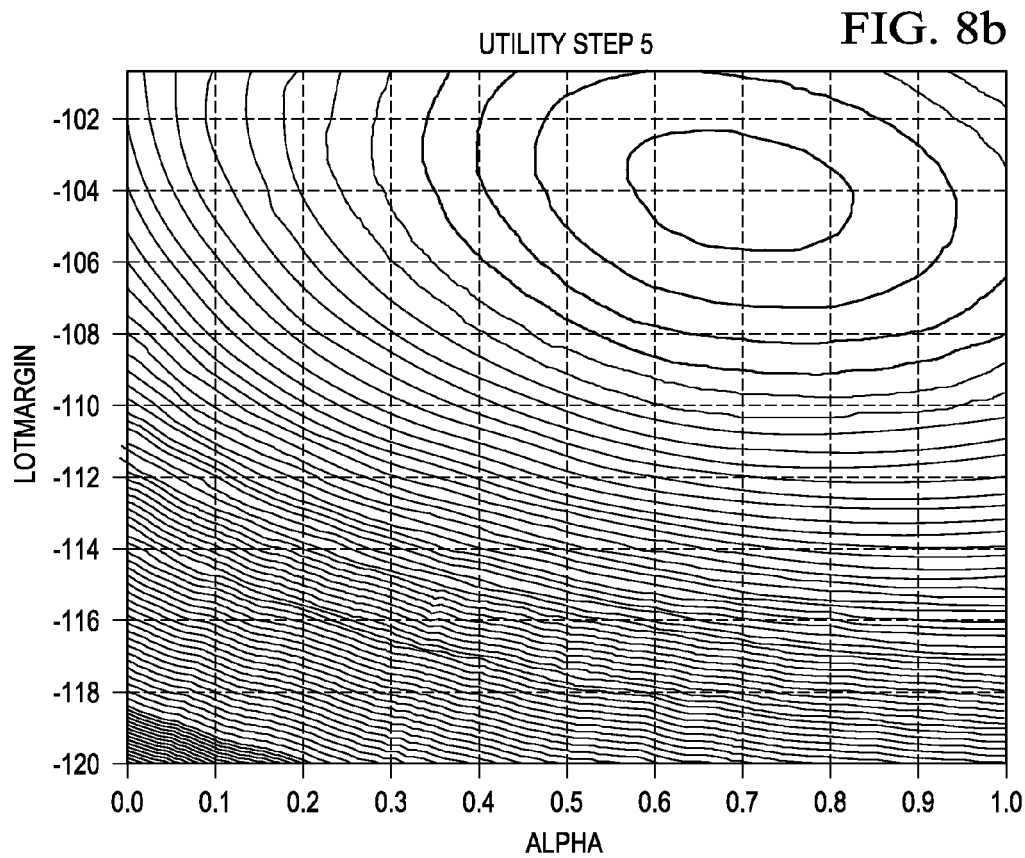
Figure 9A:
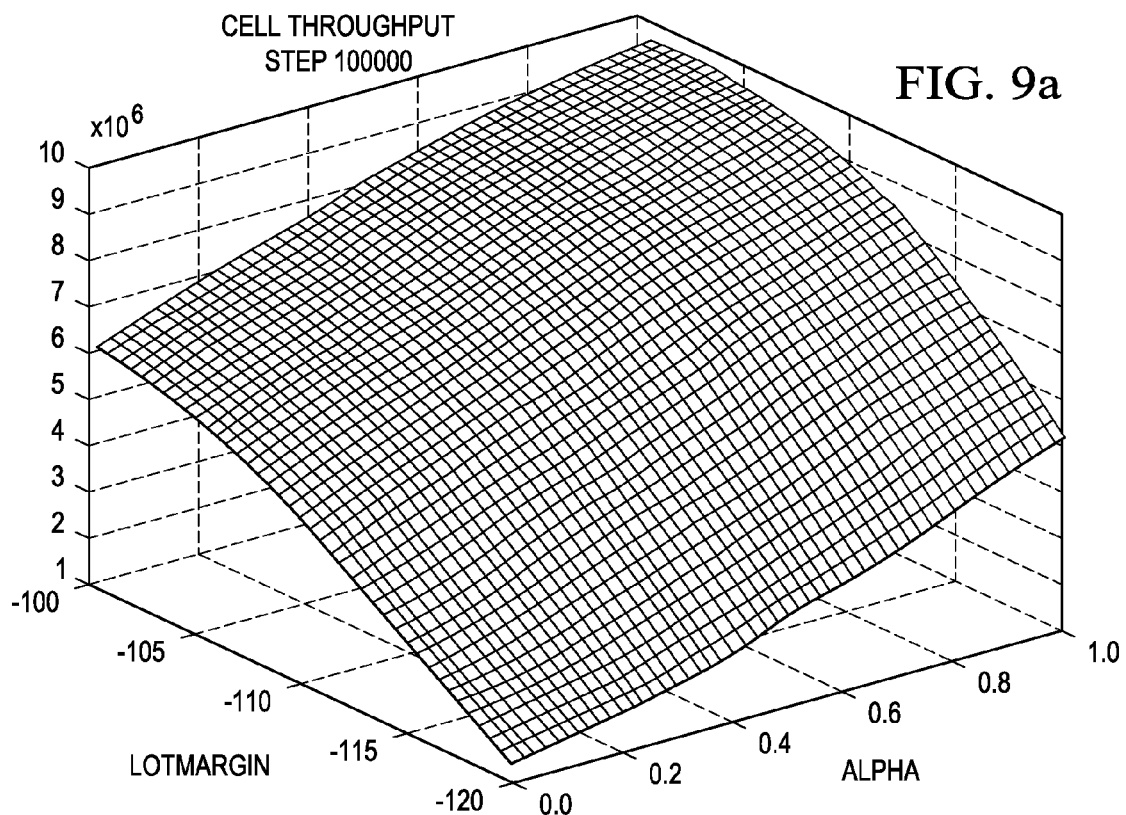
FIGS. 9a and 9b are data plots of averaged eNB cell throughput.
Figure 9B:
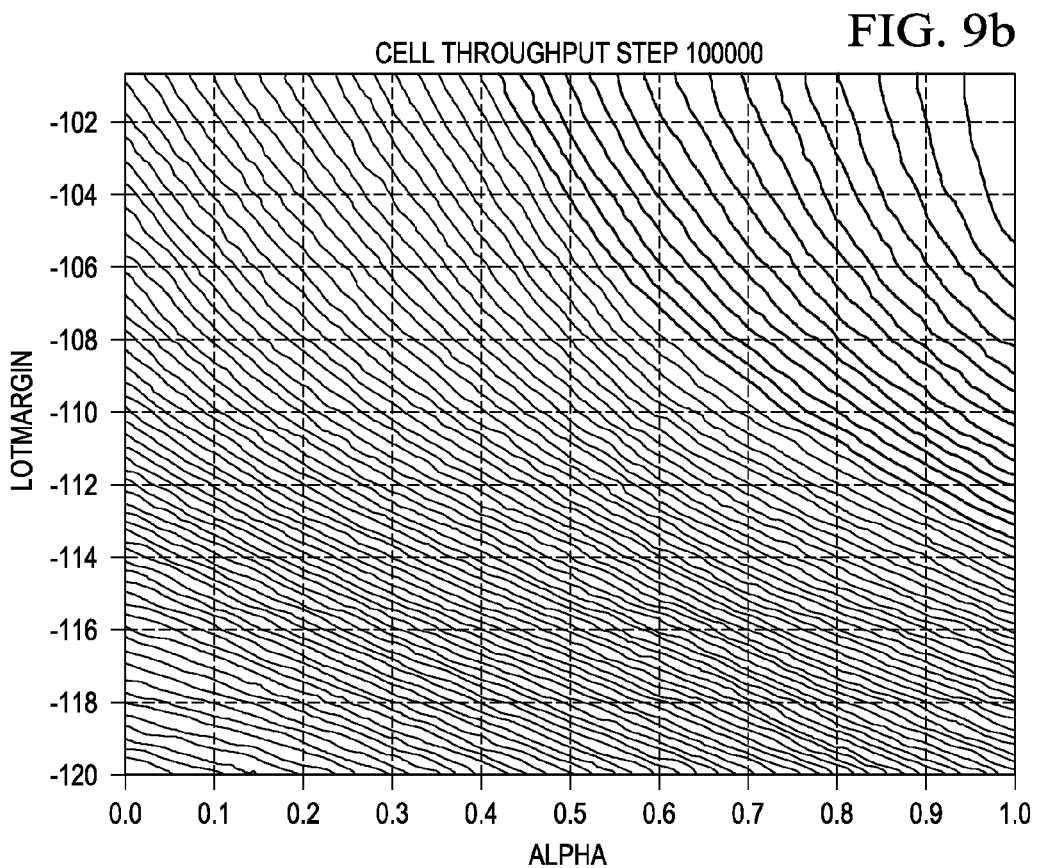

FIGS. 8a and 8b illustrate the utility of proportional fairness with respect to the parameters α and IoT Margin (parameters 1 and 2 above). As shown in FIGS. 8a and 8b, the utility reaches a maximum value when α=0.7 and IoT Margin=−104. FIGS. 9a and 9b illustrate averaged eNB throughput per UE. As shown in FIGS. 9a and 9b, the averaged throughput per UE is about 17.5% greater than that of the fractional power control and the maximal eNB throughput also appears when α=1.0.

Figure 10A:
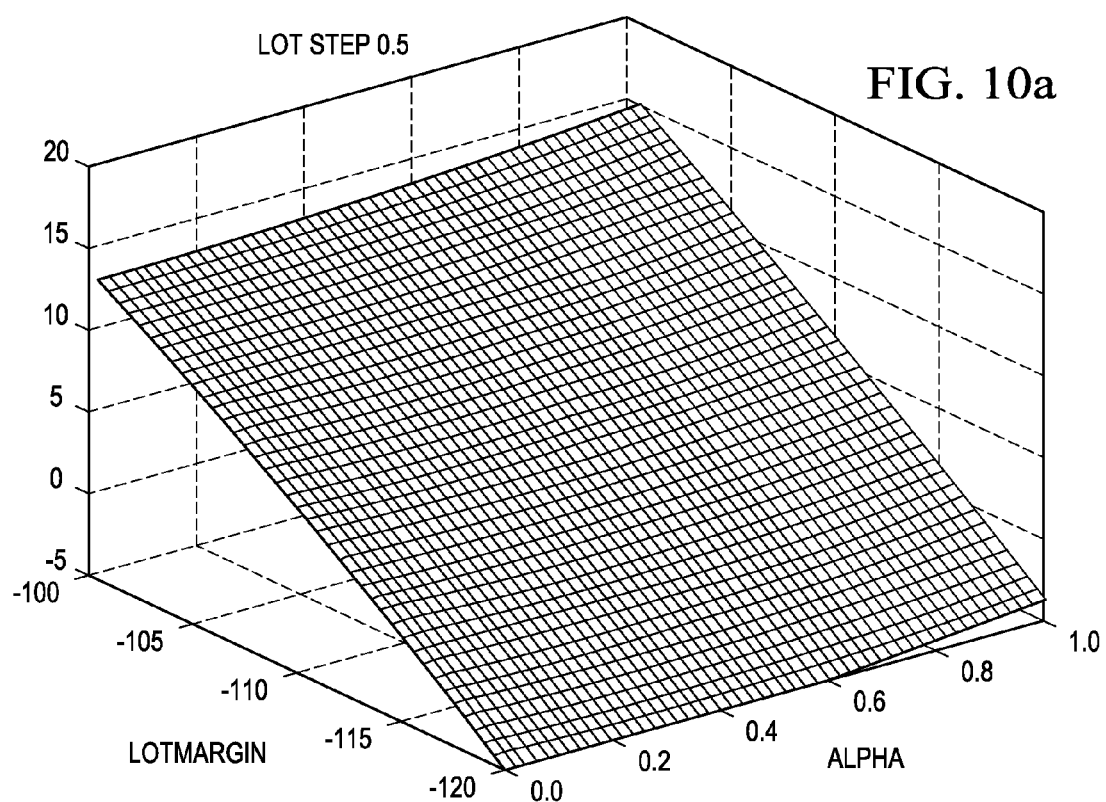
FIGS. 10a and 10b are data plots of interference (IoT) level with respect to the parameters α and IoT Margin.
Figure 10B:
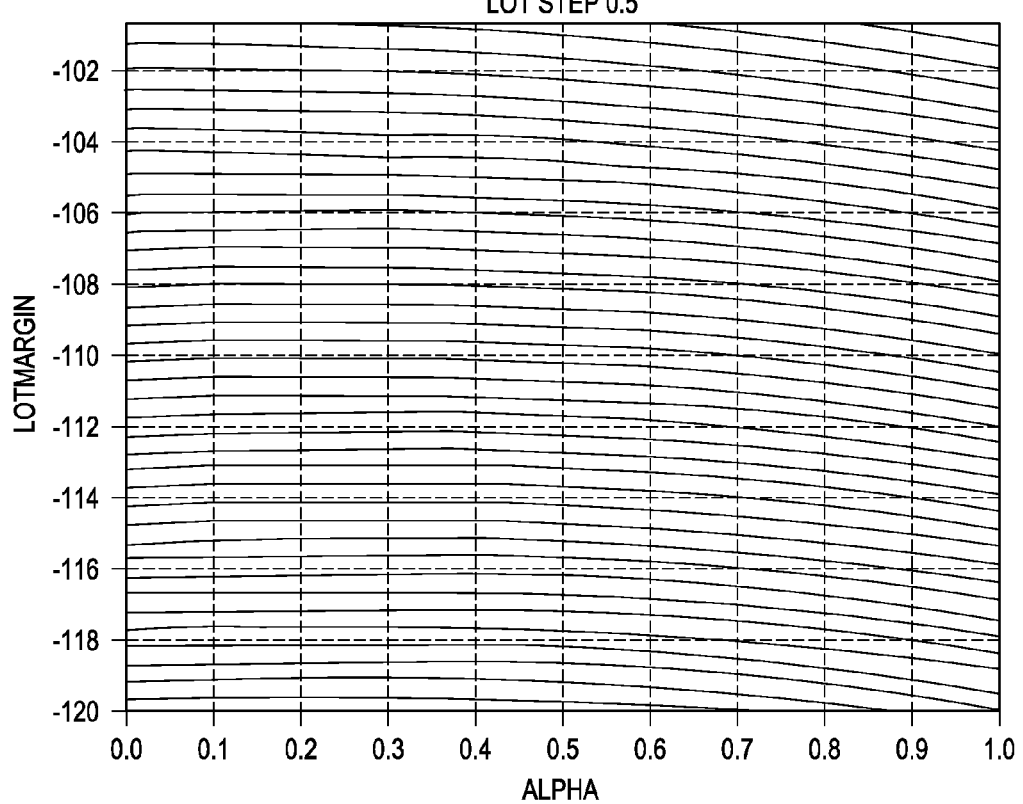
Figure 11A:
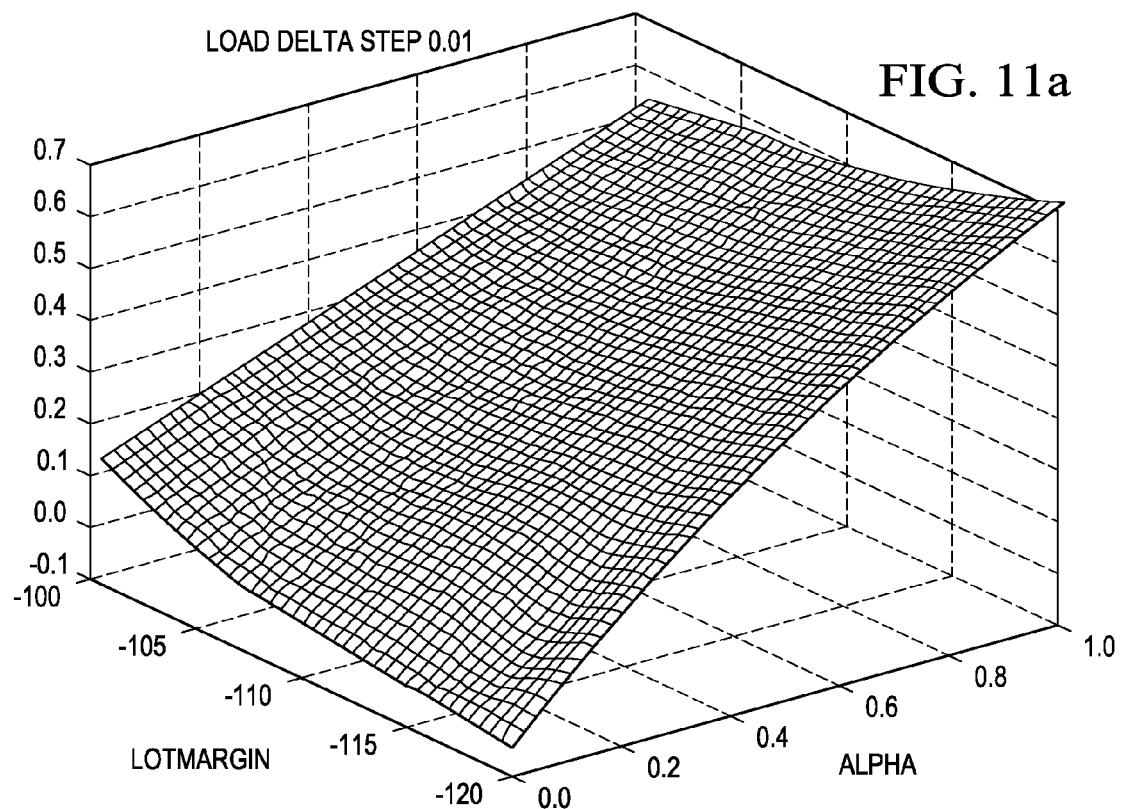
FIGS. 11a and 11b are data plots of load differences between eNB edge users and eNB central users with respect to the parameters α and IoT Margin.
Figure 11B:
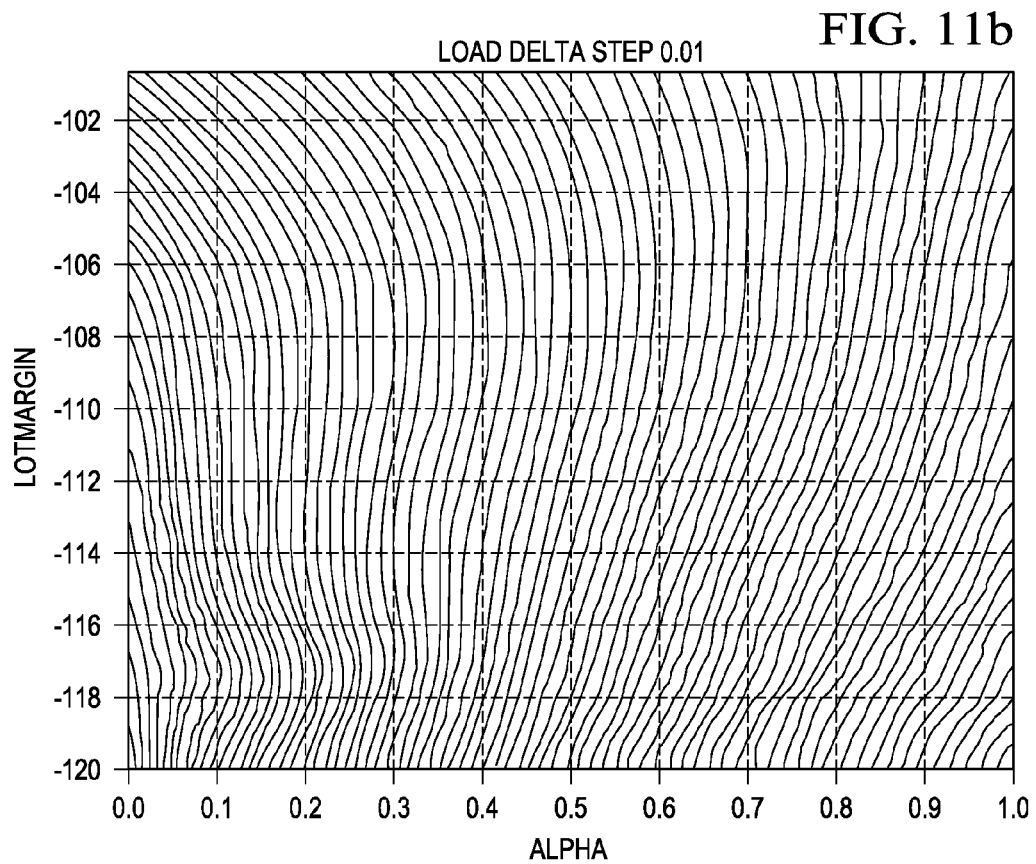

FIGS. 10a and 10b illustrate interference (IoT) level with respect to the parameters α and IoT Margin. As shown in FIGS. 10a and 10b, only IoT Margin affects IoT level and that the effect of α is minor. Also shown, when IoT Margin increases, the IoT also increases. FIGS. 11a and 11b illustrate load differences between eNB edge users and eNB central users with respect to the parameters α and IoT Margin. As shown in FIGS. 11a and 11b, the parameter a may be used to adjust the fairness between eNB edge users and eNB central users.

According to the simulation results that were shown in FIGS. 8a-11b, the performance of communications system changes smoothly with a relatively high performance of the communications system when the parameters α and IoT Margin are changed throughout an entirety of their ranges.

Advantageous features of embodiments of the invention may include: A power control method for controlling uplink transmissions by a communications device, the method comprising: computing a power offset based on a received signal power strength target and a measured received signal power strength, wherein the signal received power strength target is based on control information provided by the communications device; generating a power control command from the power offset; and transmitting the power control command to the communications device. The method could further include, wherein the received signal power strength target is based on a channel quality measurement of a channel between a controller and the communications device. The method could further include, wherein the channel quality measurement comprises a channel quality indicator (CQI). The method could further include, wherein computing a power offset comprises: computing the received signal power strength target from the CQI; and computing a delta received signal power strength from the received signal power strength target and the measured received signal power strength. The method could further include, wherein the delta received signal power strength is computed as a difference of the received signal power strength target and the measured received signal power strength. The method could further include, wherein computing a power offset further comprises, filtering the delta received signal power strength. The method could further include, wherein filtering the delta received signal power strength comprises using an alpha filter, or a Kalman filter. The method could further include, wherein computing the received signal power strength target is further computed from an interference margin. The method could further include, wherein the interference margin comprises an interference over thermal noise margin. The method could further include, wherein computing the received signal power strength target comprises, obtaining a downlink value based on the CQI. The method could further include, wherein the CQI comprises an index, and wherein obtaining a downlink value comprises retrieving a signal to interference and noise ratio (SINR) value based on the index. The method could further include, wherein the SINR value comprises a value in dB. The method could further include, wherein computing the received signal power strength target further comprises, filtering the downlink value. The method could further include, wherein the measured signal power strength is measured from uplink transmissions made by the communications device. The method could further include, wherein the measured signal power strength is measured from filtered uplink transmissions made by the communications device. The method could further include, wherein transmitting the power control command occurs in response to determining that the communications device is not transmitting its uplink transmissions at a maximum power level. The method could further include, wherein generating a power control command comprises, discretizing the power offset to one of a set of specified values. The method could further include, wherein discretizing comprises selecting a specified value from the set of specified values closest to the power offset.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for power control of uplink transmissions by a communications device, the method comprising:
computing a power offset in accordance with a signal target and a measured received signal power strength, wherein the signal target is determined in accordance with a channel quality indicator (CQI) of a channel extending between a controller and a communications device, the CQI being provided by the communications device;
generating a power control command from the power offset; and
transmitting the power control command to the communications device,
wherein the signal target comprises a transmitted signal power strength target, and
wherein computing a power offset comprises:
computing the signal target from the CQI by evaluating either Pt target=Pr target+PATHLOSS$_{DL}$ (UE) or Pt target=Pr target+PATHLOSS$_{UL}$ (UE), where PATHLOSS$_{DL}$ (UE) and PATHLOSS$_{UL}$(UE) are DL and UL channel gains in a dB domain, respectively, and Pr target is a received signal power strength target; and
computing the power offset from the signal target and the measured received signal power strength.

2. A method for power control of uplink transmissions by a communications device, the method comprising:
computing a power offset in accordance with a signal target and a measured received signal power strength, wherein the signal target is determined in accordance with a channel quality indicator (CQI) of a channel extending between a controller and a communications device, the CQI being provided by the communications device;
generating a power control command from the power offset; and transmitting the power control command to the communications device, wherein the signal target comprises a received signal power strength target, and wherein computing a power offset comprises:
computing the signal target from the CQI by evaluating either:

Pr target=IoT Margin+α×Filtered DL SINR+β×PATHLOSS$_{DL}$ (UE), or Pr target=IoT Margin+α×Filtered DL SINR+β×PATHLOSS$_{UL}$ (UE), where PATHLOSS$_{DL}$(UE) and PATHLOSS$_{UL}$(UE) are DL and UL channel gains in a dB domain, respectively, IoTMargin is an interference margin, is a tuning coefficient, and β is a constant coefficient; and computing the power offset from the signal target and the measured received signal power strength.

3. A method for power control of uplink transmissions by a communications device, the method comprising:

computing a power offset in accordance with a signal target and a measured received signal power strength, wherein the signal target is determined in accordance with a channel quality indicator (CQI) of a channel extending between a controller and a communications device, the CQI being provided by the communications device;

generating a power control command from the power offset; and transmitting the power control command to the communications device, wherein the signal target comprises a signal to interference plus noise ratio target, and wherein computing a power offset comprises:

computing the signal target from the CQI by evaluating SINR target=Pr target−Averaged_Interference, where Pr target is a received signal power strength target, and Averaged_Interference is an interference measured over a time interval; and computing the power offset from the signal target and the measured received signal power strength.

\* \* \* \* \*